tates Patent Office 2,775,598
Patented Dec. 25, 1956

2,775,598

PROCESS OF PREPARING PYRIDOXAL ISO-NICOTINOYLHYDRAZONE AND INTERMEDIATE USED THEREIN

Sydney Archer and Morris E. Auerbach, Albany, N. Y., assignors to Sterling Drug Inc., New York, N. Y., a corporation of Delaware No Drawing. Application April 14, 1955,
Serial No. 501,425

2 Claims. (Cl. 260—295)

This invention relates to an improved process for the production of pyridoxal isonicothinoxylhydrazone, which is a known compound described in an article by Sah [JACS 76, 300 (January 1954)].

The known procedure for making said compound involves converting pyridoxine—in several steps—to pyridoxal through its oxime derivative, isolating and purifying the pyridoxal, and reacting the purified aldehyde with isonicothinoylhydrazine [D. Heyl, JACS 70, 3434 (1948) and S. A. Harris et al., JACS 66, 2088 (1944)]. The yield of the hydrazone by such procedure, based on the pyridoxine starting material, is about 40 percent, and the process is very time consuming, taking from four to seven days. In contrast with such procedure, we have now invented an improved process whereby the hydrazone can be produced directly from pyridoxine without the necessity of separating the intermediate aldehyde, in a much shorter time of one to two days, and with a resulting increase in yield of at least 25 percent.

Our improved method comprises oxidizing pyridoxine to pyridoxal, converting pyridoxal in situ into a manganese salt complex of bis-(pyridoxal isonicotinoylhydrazone), and then simply decomposing the manganese salt to liberate the desired product. The process of our invention comprises the steps of heating an aqueous acidic solution of pyridoxine with manganese dioxide, treating the resulting solution containing pyridoxal and manganous ion with isonicotinoylhydrazine to form manganous bis-(pyridoxal isonicotinoylhydrazone), and heating an aqueous alkaline suspension of the manganous salt with an aqueous alkaline solution of ethylenediamine-N,N,N',N'-tetraacetic acid to liberate the pyridoxal isonicotinoylhydrazone. The heating steps of our process are carried out in the range of about 50° C. to about 125° C., preferably between 60° C. and 80° C. Higher temperatures are operable, but offer no particular advantage.

The process is illustrated diagrammatically as follows, using ammonium hydroxide to make the solution alkaline in the last step:

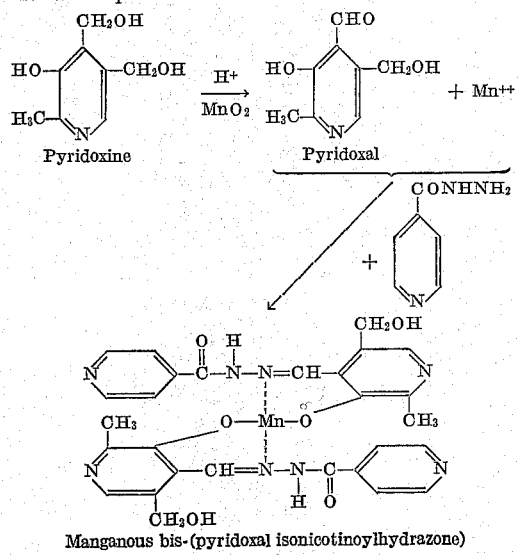

Manganous bis-(pyridoxal isonicotinoylhydrazone)

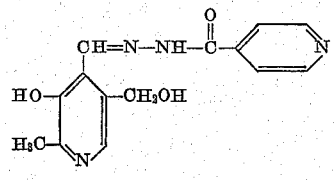

Pyridoxal Isonicotinoylhydrazone

EXAMPLE

*Pyridoxal isonicotinoylhydrazone.*—To a solution of 10 g. of pyridoxine hydrochloride in 146 ml. of water was added 5 g. of manganese dioxide and 4.8 g. of concentrated sulfuric acid. The reaction mixture was heated on a steam bath at 60–70° C. until the manganese dioxide had disappeared, this requiring about two and one-half hours. After the reaction mixture had been filtered through infusorial earth, the filtrate was heated on a steam bath and treated with 6.85 g. of isonicotinoylhydrazine dissolved in 50 ml. of water. The manganous bis-(pyridoxal isonicotinoylhydrazone) precipitated almost immediately; however, heating was continued for one-half hour, after which the solid manganous salt was collected and air dried, weight 9.7 g.

Five grams of ethylenediamine-N,N,N',N'-tetraacetic acid was suspended in 50 ml. of water and treated with enough ammonium hydroxide to affect solution and make the solution slightly basic. This was added to the manganous salt suspended in 50 ml. of water. A small amount of ammonium hydroxide was added to keep the solution basic; and the reaction mixture was heated on a steam bath for one-half hour. The free pyridoxal isonicotinoylhydrazone started to precipitate from the hot solution, which was chilled and filtered. The precipitate was dried in an oven at 70° C. and found to weigh 7 g. Recrystallization from dimethylformamide with charcoaling gave 6.2 g. of the product, pyridoxal isonicotinoylhydrazone, m. p. 252–253° C. with decomposition.

*Analysis.*—Calcd. for $C_{14}H_{14}N_4O_3$: N, 19.57; O, 16.77. Found: N, 19.70; O, 16.25.

On the basis of the above run, the yield of the product based on the starting pyridoxine hydrochloride is about 50 percent. This yield can be increased by obtaining more of the final product from the mother liquor.

We claim:

1. A process for the preparation of pyridoxal isonicotinoylhydrazone which comprises heating an aqueous acidic solution of pyridoxine with manganese dioxide, treating the resulting solution containing pyridoxal and manganous ion with isonicotinoylhydrazine to form manganous bis-(pyridoxal isonicotinoylhydrazone), collecting the precipitated manganous bis-(pyridoxal isonicotinoylhydrazone) salt, and heating an aqueous alkaline suspension of the manganous salt with an aqueous alkaline solution of ethylenediamine-N,N,N',N-tetraactice acid to liberate the pyridoxal isonicotinoylhydrazone.

2. Manganous bis-(pyridoxal isonicotinoylhydrazone).

References Cited in the file of this patent

UNITED STATES PATENTS

| 2,387,976 | Bersworth | Oct. 30, 1945 |
| 2,703,322 | Fox | Mar. 1, 1955 |

FOREIGN PATENTS

| 1,073,425 | France | Mar. 24, 1954 |

OTHER REFERENCES

Heyl: JACS 70, 3434 (1948).